United States Patent
Gao et al.

(10) Patent No.: US 12,494,957 B2
(45) Date of Patent: Dec. 9, 2025

(54) DATA TRANSMISSION METHOD, DATA RECEIVING METHOD, NETWORK DEVICE, AND STORAGE MEDIUM

(71) Applicant: ZTE CORPORATION, Shenzhen (CN)

(72) Inventors: Minggang Gao, Shenzhen (CN); Xuemei Ding, Shenzhen (CN); Chao Lei, Shenzhen (CN); Weiping Lü, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 6 days.

(21) Appl. No.: 18/294,368

(22) PCT Filed: Jul. 6, 2022

(86) PCT No.: PCT/CN2022/104191
§ 371 (c)(1),
(2) Date: Feb. 1, 2024

(87) PCT Pub. No.: WO2023/024718
PCT Pub. Date: Mar. 2, 2023

(65) Prior Publication Data
US 2024/0422044 A1 Dec. 19, 2024

(30) Foreign Application Priority Data
Aug. 25, 2021 (CN) .......................... 202110979072.5

(51) Int. Cl.
*H04L 41/0896* (2022.01)
*H04L 5/02* (2006.01)
*H04L 27/26* (2006.01)

(52) U.S. Cl.
CPC .......... *H04L 27/2637* (2013.01); *H04L 5/023* (2013.01); *H04L 27/2653* (2013.01)

(58) Field of Classification Search
CPC ............... H04B 7/0695; H04B 7/0626; H04B 7/15542; H04B 7/0617; H04B 7/024;
(Continued)

(56) References Cited

U.S. PATENT DOCUMENTS

| 11,706,772 B2 * | 7/2023 | Atungsiri .............. H04L 1/0057 370/329 |
| 2003/0016770 A1 * | 1/2003 | Trans ....................... H04B 3/32 375/346 |

(Continued)

FOREIGN PATENT DOCUMENTS

| CN | 111314033 A | 6/2020 |
| CN | 111436128 A | 7/2020 |

(Continued)

OTHER PUBLICATIONS

European Patent Office. Extended European Search Report for EP Application No. 22860064.9, mailed Oct. 9, 2024, pp. 1-11.
(Continued)

*Primary Examiner* — Eva Y Puente
(74) *Attorney, Agent, or Firm* — Vivacqua Crane, PLLC

(57) ABSTRACT

Disclosed are a data transmitting method, a data receiving method, a network device and a non-transitory computer-readable storage medium. The data transmitting method may include: acquiring first data information and second data information; performing encoding processing on the first data information according to a first resource priority tag to obtain first encoded information, and performing encoding processing on the second data information according to a second resource priority tag to obtain second encoded information; performing signal modulation processing on the first encoded information to obtain first service information, and performing signal modulation processing on the second encoded information to obtain second service information, wherein the first service information comprises the first
(Continued)

resource priority tag, and the second service information comprises the second resource priority tag; and transmitting the first service information and the second service information.

15 Claims, 7 Drawing Sheets

(58) Field of Classification Search
CPC ............... H04B 7/0632; H04B 17/318; H04B 7/18541; H04L 5/0053; H04L 5/0055; H04L 1/1812; H04L 5/0048; H04L 5/0094; H04L 5/0044; H04L 5/001; H04L 1/1854; H04W 72/23; H04W 72/0446; H04W 92/18; H04W 72/56; H04W 72/21; H04W 72/02; H04W 72/569; H04W 72/20; H04W 24/02; H04W 28/0268; H04W 72/046; H04W 72/54; H04W 16/10

See application file for complete search history.

(56) References Cited

U.S. PATENT DOCUMENTS

| | | | |
|---|---|---|---|
| 2019/0215133 A1 | 7/2019 | Pan et al. | |
| 2019/0274153 A1* | 9/2019 | Park | H04W 24/08 |
| 2020/0359403 A1 | 11/2020 | Lee et al. | |

FOREIGN PATENT DOCUMENTS

| | | |
|---|---|---|
| WO | 2018064002 A1 | 4/2018 |
| WO | 2021034234 A1 | 2/2021 |

OTHER PUBLICATIONS

International Searching Authority. International Search Report and Written Opinion for PCT Application No. PCT/CN2022/104191 and English translation, mailed Sep. 27, 2022, pp. 1-10.

* cited by examiner

DATA TRANSMISSION METHOD, DATA RECEIVING METHOD, NETWORK DEVICE, AND STORAGE MEDIUM

CROSS-REFERENCE TO RELATED APPLICATION

This application is a national stage filing under 35 U.S.C. § 371 of international application number PCT/CN2022/104191, filed Jul. 6, 2022, which claims priority to Chinese patent application No. 202110979072.5, filed Aug. 25, 2021. The contents of these applications are incorporated herein by reference in their entirety.

TECHNICAL FIELD

The present disclosure relates to the technical field of communication, and more particularly, to a data transmitting method, a data receiving method, a network device and a storage medium.

BACKGROUND

Currently, the 5th Generation (5G) wireless communication technology is a prominent topic in the industry, and there is a growing trend of adopting 5G wireless communication technology for data communication, replacing wired optical fiber deployments to improve the flexibility of communication deployment. During wireless communication, data throughput, reliability and delay are key factors that affect this process, but different data require different quality of service and have different requirements for the throughput, reliability, or delay.

Present-day terminal devices are usually fusion terminal devices, that is, terminal devices applied to the industrial field may also be applied to the civil field. In this case, it is very important to perform targeted processing on different data. However, in the process of data transmission in the related technologies, there may a problem of contradiction between improving data throughput and improving data reliability and delay performances. For example, in the process of transmitting data that need to meet the requirement of Ultra-reliable and Low Latency Communications (uRLLC) and data that need to meet the requirement of Enhanced Mobile Broadband (eMBB), it's challenging to simultaneously meet the low latency requirements posed by uRLLC and the high throughput requirements posed by eMBB, that is, it's difficult to satisfy the distinct requirements of different types of data concurrently.

SUMMARY

The following is an overview of the subject described in detail herein. This overview is not intended to limit the scope of protection of the claims.

Embodiments of the present disclosure provide a data transmitting method, a data receiving method, a network device and a storage medium, which can meet respective transmission requirements of different data.

In accordance with a first aspect of the present disclosure, an embodiment provides a data transmitting method, which may include: acquiring first data information and second data information, the first data information having a first resource priority tag, and the second data information having a second resource priority tag; performing encoding processing on the first data information according to the first resource priority tag to obtain first encoded information, and performing encoding processing on the second data information according to the second resource priority tag to obtain second encoded information; performing signal modulation processing on the first encoded information to obtain first service information, and performing signal modulation processing on the second encoded information to obtain second service information, where the first service information includes the first resource priority tag, and the second service information includes the second resource priority tag; and transmitting the first service information and the second service information.

In accordance with a second aspect of the present disclosure, an embodiment provides a data receiving method, which may include: receiving first service information and second service information, the first service information having a first resource priority tag, and the second data information having a second resource priority tag; performing signal demodulation processing on the first service information according to the first resource priority tag to obtain first encoded information, and performing signal demodulation processing on the second service information according to the second resource priority tag to obtain second encoded information; and performing decoding processing on the first encoded information to obtain first data information, and performing decoding processing on the second encoded information to obtain second data information, where the first data information includes the first resource priority tag, and the second data information includes the second resource priority tag.

In accordance with a third aspect of the present disclosure, an embodiment provides a network device, which may include: a memory, a processor, and a computer program stored in the memory and executable by the processor, where the computer program, when executed by the processor, causes the processor to implement the data transmitting method as described above in the first aspect, or the data receiving method as described above in the second aspect.

In accordance with a fourth aspect of the present disclosure, an embodiment provides a computer-readable storage medium, storing a computer program which, when executed by a processor, causes the processor to implement the data transmitting method as described above in the first aspect, or the data receiving method as described above in the second aspect.

Other features and advantages of the present disclosure will be set forth in the following description, and will be partly apparent from the description or understood by implementing the present disclosure. The objects and other advantages of the present disclosure can be realized and obtained by the structure particularly pointed out in the description, claims and drawings.

BRIEF DESCRIPTION OF DRAWINGS

The drawings are provided for a further understanding of the technical schemes of the present disclosure, and constitute a part of the description. The drawings and embodiments of the present disclosure are used to illustrate the technical schemes of the present disclosure, and do not constitute a limitation to the technical schemes of the present disclosure.

DETAILED DESCRIPTION

To make the technical schemes and advantages of the present disclosure clear, the present disclosure will be further described in detail in conjunction with the drawings and embodiments. It should be understood that the specific embodiments described here are only used to illustrate the present disclosure, and are not used to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides a data transmitting method, a data receiving method, a network device and a storage medium. In the data transmitting method, first data information having a first resource priority tag and second data information having a second resource priority tag can be acquired, that is, various information with different requirements can be acquired; and encoding processing and signal modulation processing are performed on the various information with different requirements according to the resource priority tags, such that independent processing can be performed on data information according to different requirements of the data information to meet respective requirements of different data.

In order to facilitate understanding, the system architecture for performing the data transmitting method or the data receiving method provided by the embodiment of the present disclosure will be described below in conjunction with the drawings.

Figure 1:
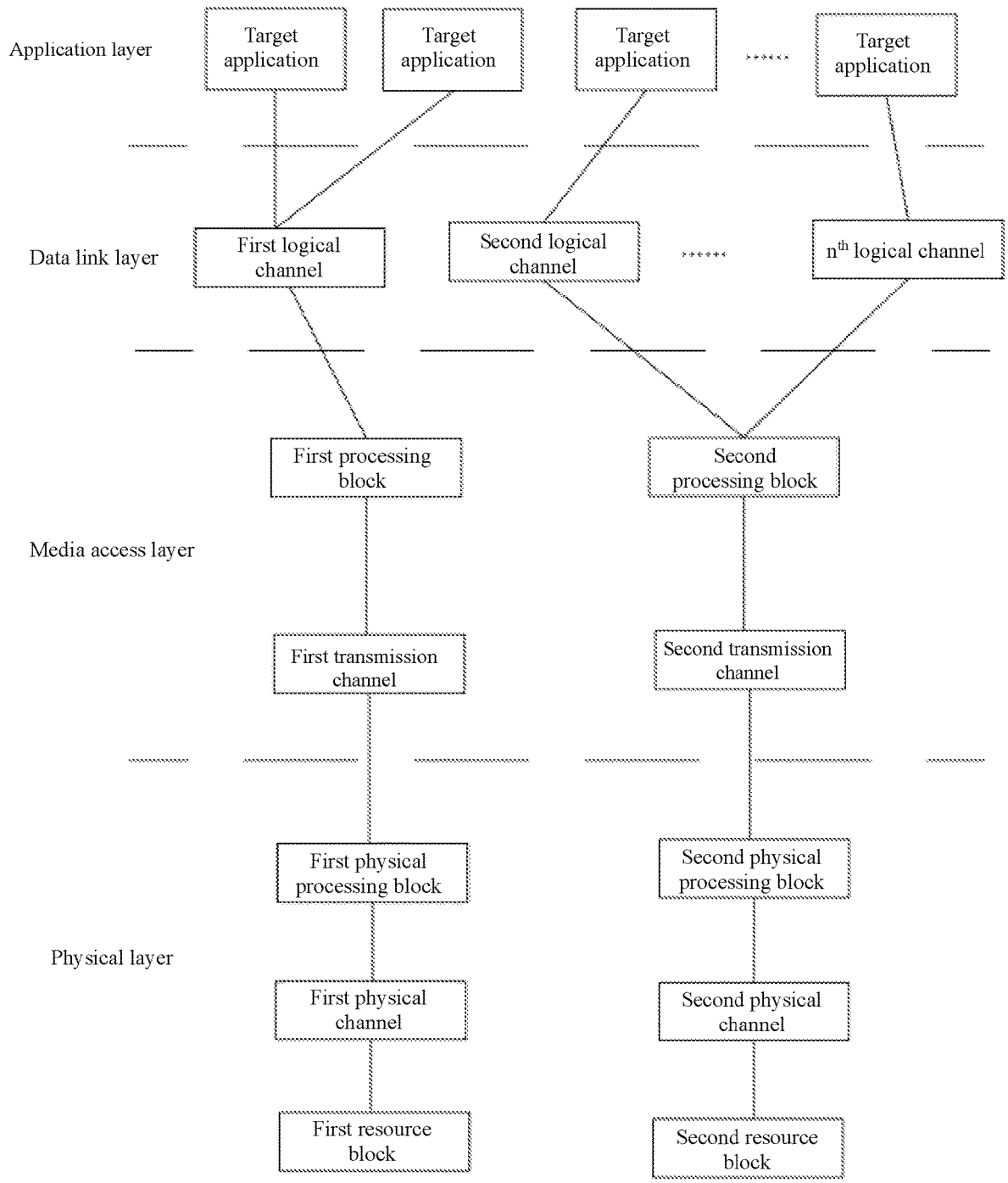
FIG. 1 is a schematic diagram of a system architecture for performing a data transmitting method or a data receiving method provided by an embodiment of the present disclosure.

FIG. 1 shows a system architecture for performing a data transmitting method or a data receiving method. The system architecture includes an application layer, a data link layer, a media access layer, and a physical layer. The application layer includes multiple target applications, such as a first target application and a second target application. Different types of target applications have different data information with different transmission requirements, such as first data information and second data information. The data link layer includes multiple logical channels, through which the data information in the target applications can be transferred to the media access layer for data processing. Data information with different requirement characteristics may be transmitted through different logical channels, so that the data information can be reversely mapped through the logical channels to obtain target applications corresponding to the data information. Multiple processing modules may be provided in the media access layer according to different requirement characteristics of data. For example, a first processing module may perform independent processing on the first data information according to the requirement characteristic of the first data information, and a second processing module may perform independent processing on the second data information according to the requirement characteristic of the second data information, that is, data information with identical resource priority tags may be mixed and multiplexed to form transmission information blocks, such that data information with different resource priority tags may form different transmission information blocks. The media access layer further includes multiple transmission channels through which the different transmission information blocks are independently transmitted to the physical layer. Multiple physical processing modules may be provided in the physical layer according to the different requirement characteristics of data, which perform independent encoding processing and modulation processing on different transmission information blocks to obtain corresponding service information, and allocate the service information to corresponding resource blocks for data transmission, thereby ensuring the service quality of data during transmission and meeting the transmission requirements of different data. For example, a first physical processing module can perform processing on the first data information according to the requirement characteristics of the first data information to obtain first service information, and allocate the first service information to a corresponding first resource block for data transmission. A second physical processing module can perform independent processing on the second data information according to the requirement characteristic of the second data information to obtain second service information, and allocate the second service information to the second resource block for data transmission.

In the case where the physical layer receives service information having different resource priority tags, that is, receives service information having different requirement characteristics, the second processing module in the physical layer can also perform independent signal demodulation processing and decoding processing on the service information according to the resource priority tags, and perform different processing on different information to meet the transmission requirements of data. Information to be demultiplexed having different requirement characteristics, that is, mixed and multiplexed transport blocks are independently transmitted to the media access layer through different transmission channels. The first processing module in the media access layer can also perform targeted demultiplexing processing on different transport blocks to obtain data information with different requirement characteristics.

Therefore, by performing targeted independent processing on data with different requirement characteristics at the media access layer and the physical layer, the service quality of data during transmission can be guaranteed and the respective requirements of different data can be met.

It should be noted that the physical layer may include a network card, a network cable, a hub, a repeater or a modem, and the data link layer may include a bridge or a switch.

The system architecture for performing a data transmitting method or a data receiving method described in the embodiment of the present disclosure is used to illustrate the technical scheme in the embodiment of the present disclosure more clearly, and is not intended to limit the technical scheme provided by the embodiment of the present disclosure. Those having ordinary skills in the art can know that, with the evolution of system architectures and the emergence of new application scenarios, the technical schemes provided by the embodiments of the present disclosure are also applicable to similar technical problems.

Those having ordinary skills in the art can understand that the structure of the system architecture shown in FIG. 1 does not constitute a limitation to the embodiment of the present disclosure and may include more or fewer components than shown, or combinations of some components, or different component arrangements.

Based on the structure of the above system architecture, various embodiments of the data transmitting method and data receiving method of the present disclosure are proposed.

Figure 2:
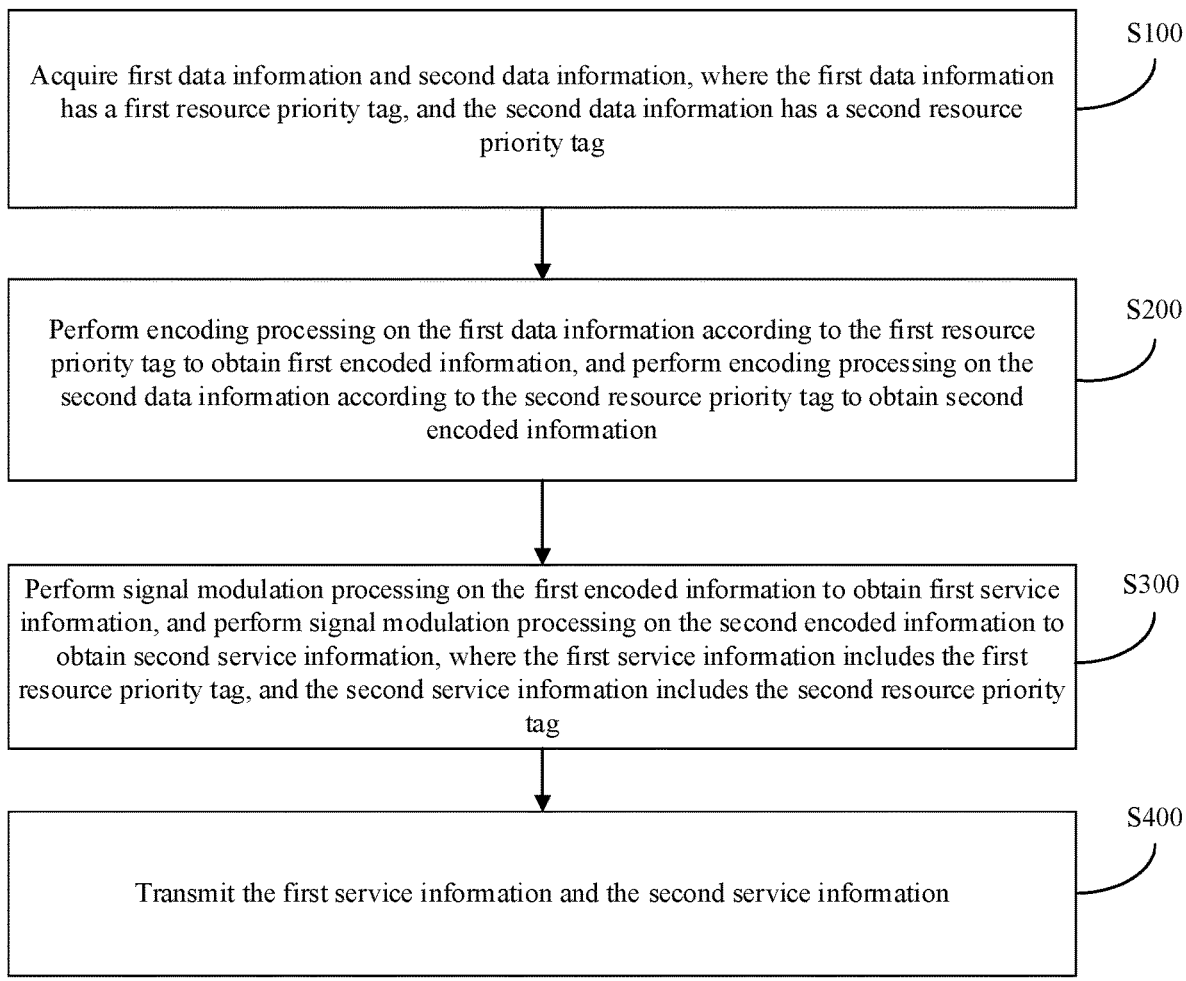
FIG. 2 is a flowchart of a data transmitting method provided by an embodiment of the present disclosure.

Referring to FIG. 2, FIG. 2 shows a flowchart of a data transmitting method provided by an embodiment of the present disclosure. The data transmitting method may be applied to the system architecture shown in FIG. 1, and the data transmitting method includes, but not limited to, following steps.

In a step of S100, first data information and second data information are acquired, where the first data information has a first resource priority tag, and the second data information has a second resource priority tag.

It can be understood that during communication, different data information requires different service qualities and has different requirements. For example, the first data information may be data information having a requirement for Ultra-reliable and Low Latency Communications (uRLLC) and the second data information may be data information having a requirement for Enhanced Mobile Broadband (eMBB), and the first data information and the second data information have different requirements for throughput, reliability and delay performances. The data information having a requirement for uRLLC is generally applied to special applications such as Internet of Vehicles, industrial control, telemedicine, etc. Such applications require extremely high security, reliability and delay performances for data information, and require high priority for reliability and delay performances; while the data information having a requirement for eMBB requires high data transmission rate and requires high priority for throughput, that is, the first resource priority tag of the first data information is different from the second resource priority tag of the second data information. Therefore, different data information has different resource priority tags and requires different data processing. Resource priority tags may help to classify data information to meet respective requirements of different data.

It should be noted that the first data information and the second data information may be from the application layer, the application layer includes multiple target applications, such as a first target application and a second target application, and different types of target applications have data information with different requirements for transmission. The first data information and the second data information may be transmitted to the media access layer through the logical channels in the data link layer, such that the first data information and the second data information are acquired. The first data information and the second data information are transmitted through different logical channels, and the data link layer can allocate logical channels with different priorities for transmission according to different requirements of the first data information and the second data information, so as to meet the requirements of the first data information and the second data information and guarantee the service quality of the first data information and the second data information.

In a step of S200, encoding processing is performed on the first data information according to the first resource priority tag to obtain first encoded information, and encoding processing is performed on the second data information according to the second resource priority tag to obtain second encoded information.

In a step of S300, signal modulation processing is performed on the first encoded information to obtain first service information, and signal modulation processing is performed on the second encoded information to obtain second service information, where the first service information includes the first resource priority tag, and the second service information includes the second resource priority tag.

In a step of 400, data transmission is performed on the first service information and the second service information.

It can be understood that different data information with different requirements may need different data processing, and the first data information and the second data information are distinguished and classified according to resource priority tags, so as to perform separate targeted processing on data information of the same type and meet the requirements of data information. The resource priority tags can represent requirement characteristics of the data information. Therefore, independent encoding processing is performed on the first data information according to the first resource priority tag to meet requirements of the first data information and obtain first encoded information. Independent encoding processing is performed on the second data information according to the second resource priority tag to meet requirements of the second data information and obtain second encoded information. In addition, independent signal modulation processing is performed on the first encoded information according to the first resource priority tag, to meet the requirement characteristics of the first encoded information and obtain first service information, where the first service information also includes the first resource priority tag. Independent signal modulation processing is performed on the second encoded information according to the second resource priority tag to meet the requirement characteristics of the second encoded information and obtain second service information. The first data information and the second data information are respectively subjected to independent processing to obtain first service information and second service information with respective requirements satisfied, and then the first service information and the second service information are transmitted. Therefore, independent encoding processing and signal modulation processing are performed on the first data information and the second data information according to the first resource priority tag and the second resource priority tag, such that the first data information and the second data information can be processed independently according to different requirement characteristics of the first data information and the second data information, and the service quality of the first data information and the second data information during transmission can be guaranteed. Therefore, by independently processing various data according to respective requirement characteristics of the data, respective requirements of different data can be met.

It should be noted that the encoding processing and signal modulation processing performed on the first data information and the encoding processing and signal modulation processing performed on the second data information are independent processing, such that corresponding priority-based processing can be allocated to the first data information according to the first resource priority tag, and to the second data information according to the second resource priority tag. The two processing are independent of each other and do not interfere with each other, such that respective requirements of different data information can be met. The first resource priority tag and the second resource priority tag may be identical or different. If the first resource priority tag and the second resource priority tag are identical, the encoding processing performed on the first data information and the encoding processing performed on the second data information may be identical, and the signal modulation processing performed on the first encoded information and the signal modulation processing performed on the second encoded information may also be identical. In the related technology, if encoding processing and signal modulation processing performed on all data information are identical, only requirement characteristics of some data information can be met, corresponding processing cannot be performed on different data according to requirement characteristics of different data, and respective requirements of different data cannot be met. However, in the embodiment of the present disclosure, if the first resource priority tag and the second resource priority tag are different, that is, the respective requirement characteristics of the first data information and the second data information are different, the encoding processing performed on the first data information and the encoding processing performed on the second data information are different, and the signal modulation processing performed on the first encoded information and the signal modulation processing performed on the second encoded information are also different. Therefore, corresponding independent processing is performed on different data according to the requirement characteristics of different data to meet respective requirements of different data.

Figure 3:
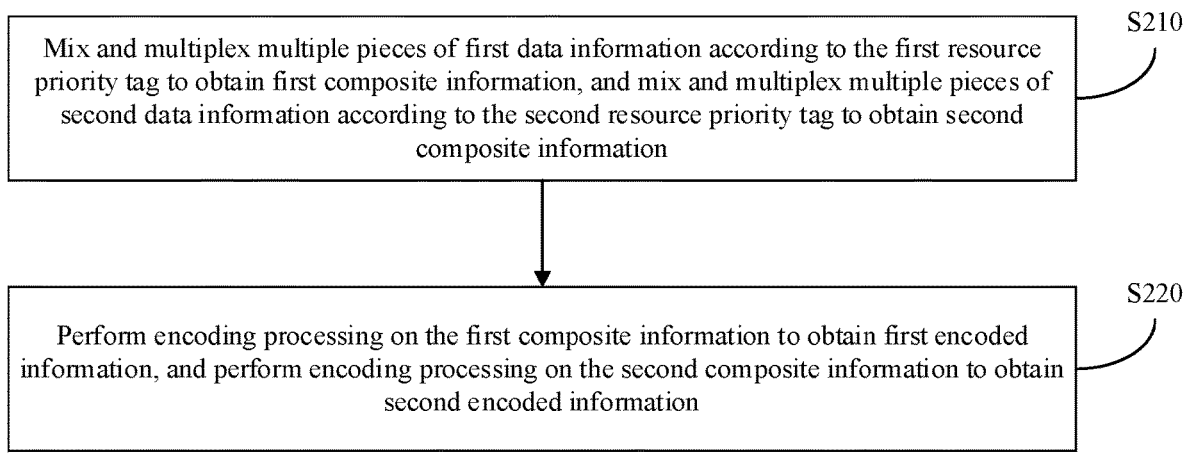
FIG. 3 is a flowchart of an implementation process of S200 in FIG. 2.

Referring to FIG. 3, S200 in the embodiment shown in FIG. 2 further includes, but not limited to, the following steps.

In a step of S210, multiple pieces of first data information are mixed and multiplexed according to the first resource priority tag to obtain first composite information, and multiple pieces of second data information are mixed and multiplexed according to the second resource priority tag to obtain second composite information.

In a step of S220, encoding processing is performed on the first composite information to obtain first encoded information, and encoding processing is performed on the second composite information to obtain second encoded information.

There are multiple pieces of first data information, and multiple pieces of second data information.

It can be understood that during information transmission, to improve the transmission efficiency, multiple data may be acquired and processed simultaneously. In the case where multiple pieces of first data information and multiple pieces of second data information are obtained, the multiple pieces of first data information may be screened out from the large amount of data information according to the first resource priority tag, and are mixed and multiplexed to obtain first composite information. Meanwhile, the multiple pieces of second data information may be selected according to the second resource priority tag, and are mixed and multiplexed to obtain second composite information. Therefore, the data information with different requirement characteristics are classified, and then the data information with identical requirement characteristics are mixed and multiplexed, which improves the processing efficiency and transmission efficiency. A parameter Modulation and Coding Scheme (MCS) corresponding to the first composite information is adjusted according to requirement characteristics of the first composite information, and independent encoding processing is performed on the obtained first composite information to obtain first encoded information. MCS corresponding to the second composite information is adjusted according to requirement characteristics of the second composite information, and independent encoding processing is also performed on the obtained second composite information to obtain second encoded information. For example, the first composite information has a high requirement for throughput, and the second composite information has a high requirement for reliability. Therefore, the MCS corresponding to the first composite information is increased to improve throughput, while the MCS corresponding to the second composite information is decreased to improve reliability, such that the first composite information and the second composite information can be processed independently according to respective requirement characteristics, to meet respective requirements of the first composite information and the second composite information. Therefore, by classifying the data information with different requirement characteristics and then processing data information with identical requirement characteristics independently, the situation where requirements of different data cannot be met due to the fact that data with different requirement characteristics are mixed for processing can be avoided.

It should be noted that after obtaining the first data information and the second data information, the media access layer transmits the first data information and the second data information to the physical layer through different transmission channels according to the requirement characteristics of the first data information and the second data information for subsequent encoding processing and signal modulation processing. In the related technology, the media access layer performs mixing processing and mixing transmission on data with different requirement characteristics, and the physical layer cannot adjust and process the data according to the requirement characteristics of the data, failing to meeting respective requirements of different data. In this embodiment, in order to improve the transmission channel efficiency, and perform independent processing on data with different requirement characteristics to meet respective requirements of different data, the media access layer can perform independent data mixing and multiplexing processing on the first data information according to the first resource priority tag, and allocate a matching transmission channel according to the requirement characteristics of the first data information to transmit the composite information. The media access layer can also independently process the second data information according to the second resource priority tag, and allocate a corresponding transmission channel to meet the requirement characteristics of the second data information. In addition, classifying and transmitting data with different requirement characteristics can not only meet respective requirements of the data, but also help the physical layer to independently process data according to requirement characteristics of the data. Therefore, the physical layer can adjust corresponding parameters of the physical layer for different data according to different requirement characteristics to independently process data according to the requirement characteristics of different data, thereby meeting respective requirements of different data, guaranteeing the service quality of different data during transmission.

Figure 4:
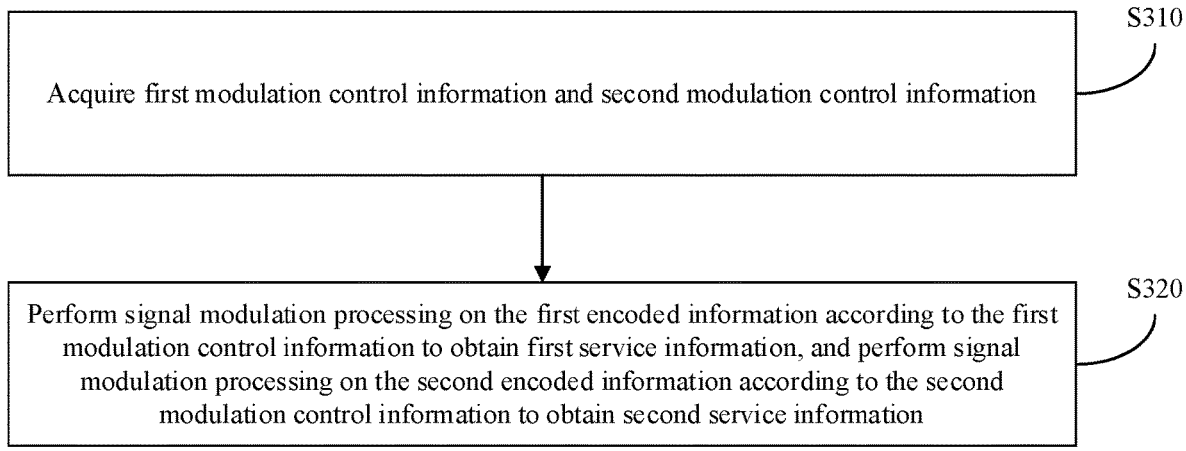
FIG. 4 is a flowchart of an implementation process of S300 in FIG. 2.

Referring to FIG. 4, S300 in the embodiment shown in FIG. 2 further includes, but not limited to, the following steps.

In a step of S310, first modulation control information and second modulation control information are acquired.

In a step of S320, signal modulation processing is performed on the first encoded information according to the first modulation control information to obtain first service information, and signal modulation processing is performed on the second encoded information according to the second modulation control information to obtain second service information.

It can be understood that in order to guarantee the communication effect, it is necessary to modulate data. Data may be modulated in multiple modes, such as Amplitude Shift Keying (ASK), Phase Shift Keying (PSK), Frequency Shift Keying (FSK), and Quadrature Amplitude Modulation (QAM). Different modulation modes perform different signal modulation processing on data, which will affect the transmission characteristics of data. In order to meet respective requirements of different data, that is, when the requirement characteristics of the first encoded information and the second encoded information are different, it is necessary to adopt corresponding modulation modes for the first encoded information and the second encoded information. First modulation control information corresponding to the first encoded information can be obtained according to the first resource priority tag, and second modulation control information corresponding to the second encoded information can be obtained according to the second resource priority tag. Therefore, the first modulation control information and the second modulation control information are acquired to perform independent signal modulation processing on corresponding encoded information, so as to avoid mixing and unifying processing. In this way, different encoded information can be processed according to requirement characteristics of different encoded information, to meet respective requirements of different encoded information.

It can be understood that independent signal modulation processing is performed on the first encoded information according to the first modulation control information, that is, independent signal modulation processing is performed on the first encoded information in a modulation mode that can meet the requirement characteristics of the first encoded information, so as to meet the requirement characteristics of the first encoded information and obtain first service information, where the first service information retains the first resource priority tag. Independent signal modulation processing is performed on the second encoded information according to the second modulation control information, that is, independent signal modulation processing is performed on the second encoded information in a modulation mode that can meet the requirement characteristics of the second encoded information, to obtain second service information, where the second service information has the second resource priority tag. The signal modulation processing performed on the second encoded information and the signal modulation processing performed on the first encoded information are independent of each other and do not interfere with each other, which can meet respective requirement characteristics of the first encoded information and the second encoded information.

It should be noted that the first modulation control information and the second modulation control information may be obtained according to parameters of the physical layer. The physical layer parameters may include modulation mode, demodulation mode, encoding scheme, decoding scheme and resource block allocation scheme. When respective requirement characteristics of the first encoded information and the second encoded information are different, the first modulation control information and the second modulation control information are different, because the first modulation control information and the second modulation control information are associated with the respective requirement characteristics of the first encoded information and the second encoded information. For example, the first encoded information requires high throughput, while the second encoded information requires high reliability. Therefore, to meet different requirement characteristics of the first encoded information and the second encoded information, different physical layer parameters may need to be adopted, that is, independent processing is performed on the first encoding information and the second encoding control information respectively according to the first modulation control information and the second modulation control information which are different. MCS contained in the first modulation control information is increased to improve data transmission rate. After signal modulation processing is performed on the first encoded information, the high throughput requirement of the first encoded information can be met. MCS contained in the second modulation control information is decreased to reduce data transmission rate and improve reliability, such that the high reliability requirement of the second encoded information can be met after signal modulation processing is performed on the second encoded information by adopting the second modulation control information. In addition, to facilitate data processing, the first modulation control information may be transmitted together with the first service information, while the second modulation control information may be transmitted together with the second service information, and the first modulation control information and the second modulation control information may be transmitted through different physical control channels. Therefore, corresponding modulation control information is customized according to respective requirement characteristics of different data, and data is processed independently by adopting the corresponding modulation control information, such that respective requirements of different data can be met at the same time.

Figure 5:
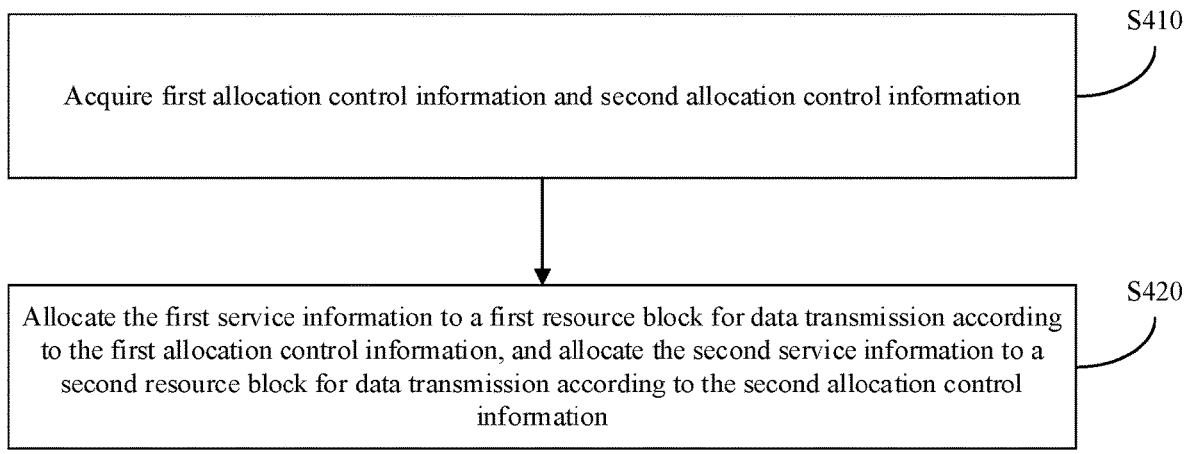
FIG. 5 is a flowchart of an implementation process of S400 in FIG. 2.

Referring to FIG. 5, S400 in the embodiment shown in FIG. 2 further includes, but not limited to, the following steps.

In a step of S410, first allocation control information and second allocation control information are acquired.

In a step of S420, the first service information is allocated to a first resource block for data transmission according to the first allocation control information, and the second service information is allocating to a second resource block for data transmission according to the second allocation control information.

It can be understood that in order to meet the respective requirement characteristics of different data and guarantee the service quality of different data during transmission, it is necessary to allocate data with different requirement characteristics to different resource blocks for independent data transmission. The first allocation control information corresponds to the first resource priority tag, and the second allocation control information corresponds to the second resource priority tag. The acquired first allocation control information and second allocation control information can be used to allocate corresponding service information to corresponding resource blocks for data transmission, so as to meet respective requirement characteristics of the first service information and the second service information.

Figure 6:
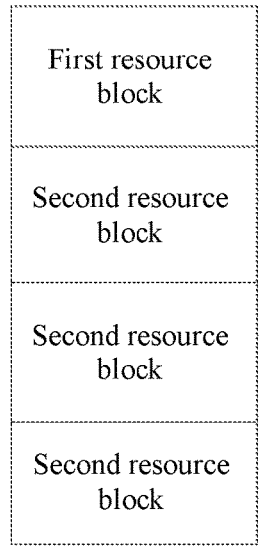
FIG. 6 is a schematic diagram of allocation of resource blocks provided by an embodiment of the present disclosure.

Referring to FIG. 6, FIG. 6 shows a schematic diagram of allocation of resource blocks. It can be understood that the first service information is allocated to a corresponding first resource block for data transmission according to the first allocation control information, and the second service information is allocated to a corresponding second resource block for data transmission according to the second allocation control information. Therefore, service information with different requirement characteristics is allocated to different resource blocks for independent data transmission, such that the requirements for transmission rate of service information with different requirement characteristics can be met, and the situation where respective requirements of different data cannot be met due to the fact that service information with different requirement characteristics is allocated to the same resource block for mixed transmission can be avoided. For example, the first service information requires high throughput, while the second service information requires high reliability. The MCS corresponding to the first service information is set to 25, while the MCS corresponding to the second service information is set to 15, that is, the first service information requires high transmission rate to meet the high throughput requirement of the first service information, while the second service information requires low transmission rate to meet the high reliability requirement of the second service information. Because transmission rates of data with different requirements are different to meet respective requirements, it is necessary to allocate different data to different resource blocks for data transmission, for example, there are four resource blocks that can be used for data transmission. In the related technology, because independent processing is not performed on data with different requirements, and the data is subjected to unifying processing and mixed transmission, the respective requirements of different data cannot be met, and the service quality of different data during transmission cannot be guaranteed. In this embodiment, the first service information requiring high transmission rate is allocated to one first resource block through a first physical channel of the physical layer for data transmission, and the second service information requiring low transmission rate is allocated to three second resource blocks through a second physical channel of the physical layer for data transmission. The first resource block and the second resource blocks are independent of each other, such that the utilization rate and transmission efficiency of resource blocks can be improved, and the first service information and the second service information do not affect each other during transmission, thereby meeting respective requirement characteristics. In addition, to facilitate data processing, the first allocation control information may be transmitted together with the first service information, while the second allocation control information may be transmitted together with the second service information, and the first allocation control information and the second allocation control information may be transmitted through different physical control channels.

Figure 7:
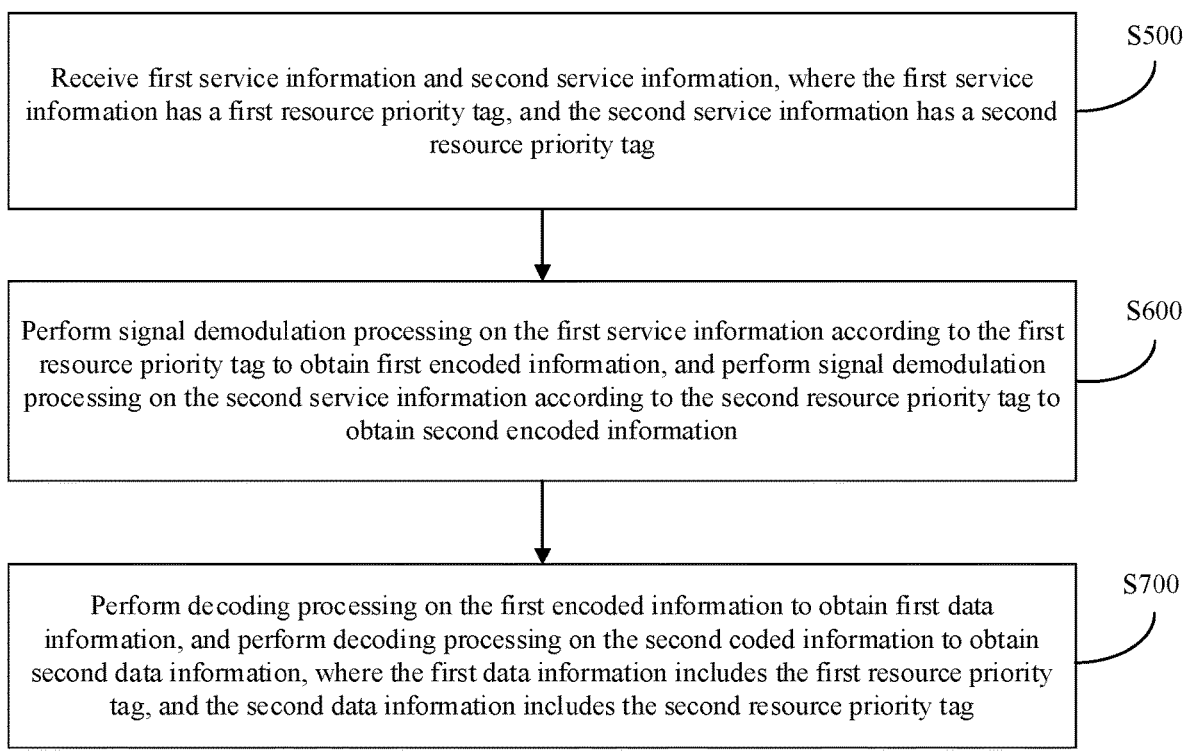
FIG. 7 is a flowchart of a data receiving method provided by an embodiment of the present disclosure.

Referring to FIG. 7, FIG. 7 shows a flowchart of a data receiving method provided by an embodiment of the present disclosure. The data receiving method may be applied to the system architecture shown in FIG. 1, and the data receiving method includes, but not limited to, the following steps.

In a step of S500, first service information and second service information are received, where the first service information has a first resource priority tag, and the second service information has a second resource priority tag.

In a step of S600, signal demodulation processing is performed on the first service information according to the first resource priority tag to obtain first encoded information, and signal demodulation processing is performed on the second service information according to the second resource priority tag to obtain second encoded information.

In a step of S700, decoding processing is performed on the first encoded information to obtain first data information, and decoding processing is performed on the second encoded information to obtain second data information, where the first data information includes the first resource priority tag, and the second data information includes the second resource priority tag.

It can be understood that the first service information has a first resource priority tag, the second service information has a second resource priority tag, and different service information requires different service qualities and different requirement characteristics. For example, the first service information may need to be applied to an uRLLC scenario, so that the first service information may need to have the characteristics of high reliability and low delay, and thus the requirement characteristics of high reliability and high delay performances of the first service information can be correspondingly identified through the first resource priority tag. For another example, the second service information may need to be applied to an eMBB scenario, so that the second service information requires high throughput, and thus the requirement characteristic of high throughput of the second service information can be identified through the second resource priority tag. Therefore, targeted processing can be performed on the first service information and the second service information respectively according to the first resource priority tag and the second resource priority tag, to meet the respective requirement characteristics of the first service information and the second service information and guarantee the service quality of the first service information and the second service information during communication.

It can be understood that the first service information and the second service information which have different requirements may need different data processing. Therefore, the first service information and the second service information can be identified through the first resource priority tag and the second resource priority tag, and corresponding processing is performed on the first service information and the second service information to meet respective requirement characteristics of the first service information and the second service information. Signal demodulation processing is performed on the first service information according to the first resource priority tag to obtain first encoded information, and signal demodulation processing is performed on the second service information according to the second resource priority tag to obtain second encoded information. Therefore, the signal demodulation processing performed on the first service information and the signal demodulation processing performed on the second service information are independent of each other, which can meet the requirement characteristics of the first service information and the second service information respectively. After performing independent signal demodulation processing to obtain the first encoded information and the second encoded information, independent decoding processing is performed on the first encoded information and the second encoded information respectively according to respective requirement characteristics of the first encoded information and the second encoded information, to obtain first data information and second data information which meet respective requirement characteristics, thereby guaranteeing the service quality of the first service information and the second service information during transmission. Therefore, by performing independent processing on various data according to respective requirement characteristics of the data, respective requirements of different data can be met.

Figure 8:
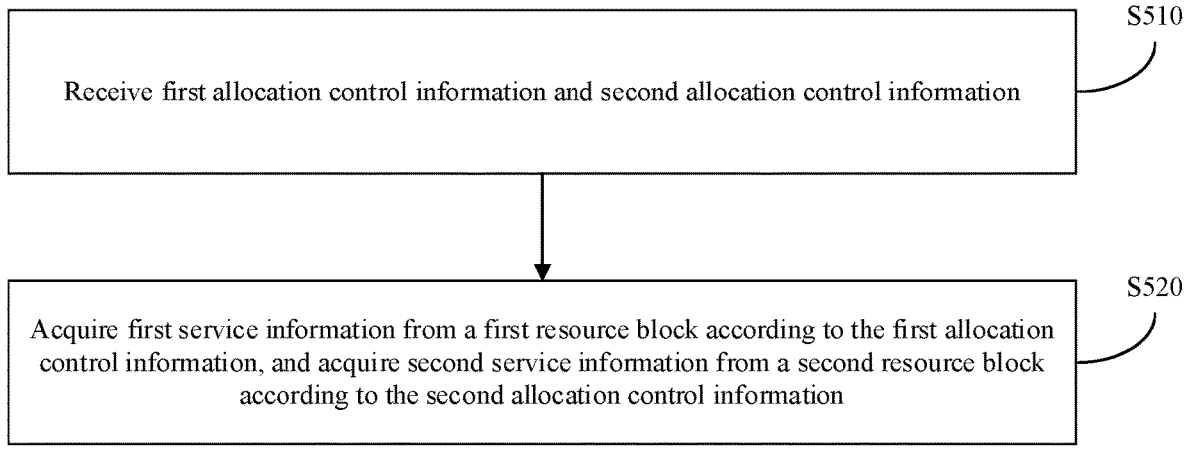
FIG. 8 is a flowchart of an implementation process of S500 in FIG. 7.

Referring to FIG. 8, S500 in the embodiment shown in FIG. 7 further includes, but not limited to, the following steps.

In a step of S510, first allocation control information and second allocation control information are received.

In a step of S520, first service information is acquired from a first resource block according to the first allocation control information, and second service information is acquired from a second resource block according to the second allocation control information.

It can be understood that in order to meet the respective requirement characteristics of different data and guarantee the service quality of different data during transmission, data with different requirement characteristics are allocated to different resource blocks for independent data transmission, where the transmitted data contains first allocation control information related to the first service information and second allocation control information related to the second service information. After the first allocation control information and the second allocation control information are received, first service information can be acquired from the first resource block through the first allocation control information, and second service information can be acquired from the second resource block through the second allocation control information.

It should be noted that the first allocation control information and the second allocation control information may be from the physical control channels of the physical layer, the first allocation control information corresponds to the first resource priority tag included in the first service information, and the second allocation control information corresponds to the second resource priority tag included in the second service information. Therefore, when the first allocation control information and the second allocation control information are detected, the first allocation control information and the second allocation control information are received, where the first allocation control information contains an allocation parameter of the resource block where the first service information is located, and the second allocation control information contains an allocation parameter of the resource block where the second service information is located. Therefore, the first service information can be acquired from the first resource block where the first service information is located through the corresponding first physical channel according to the first allocation control information, and the second service information can be acquired from the second resource block through the corresponding second physical channel according to the second allocation control information.

Figure 9:
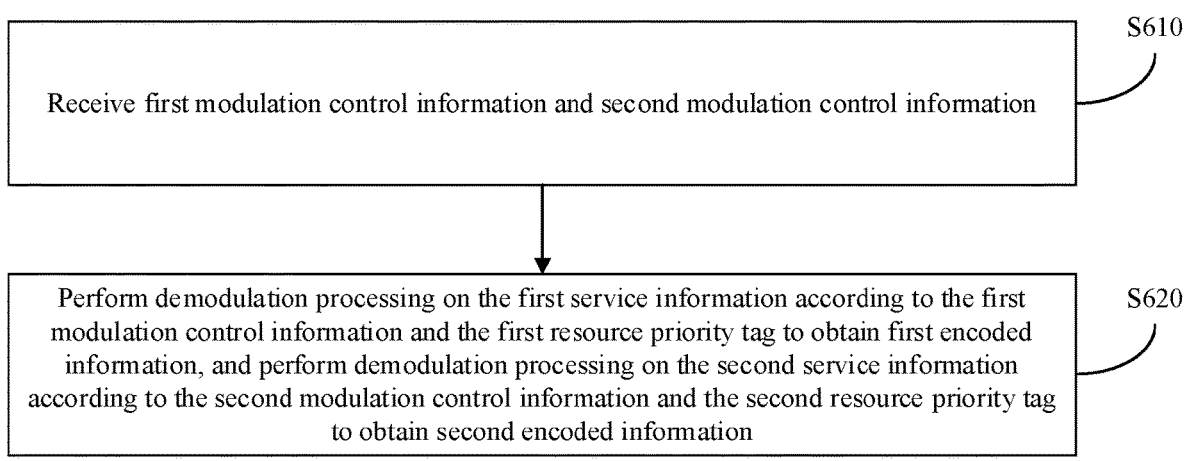
FIG. 9 is a flowchart of an implementation process of S600 in FIG. 7.

Referring to FIG. 9, S600 in the embodiment shown in FIG. 7 further includes, but not limited to, the following steps.

In a step of S610, first modulation control information and second modulation control information are received.

In a step of S620, demodulation processing is performed on the first service information according to the first modulation control information and the first resource priority tag to obtain first encoded information, and demodulation processing is performed on the second service information according to the second modulation control information and the second resource priority tag to obtain second encoded information.

It can be understood that during data transmission, data is subjected to signal modulation processing and then transmitted. Therefore, to utilize the modulated data, it is necessary to demodulate the modulated data. Because different data may be processed in different modulation modes to meet respective requirements of different data, demodulation processing performed on the data may need to match the modulation mode of data. The first modulation control information corresponds to the first resource priority tag included in the first encoded information, and the second modulation control information corresponds to the second resource priority tag included in the second encoded information. The first modulation control information contains a modulation mode of the first service information, and the second modulation control information contains a modulation mode of the second service information. In addition, the first modulation control information and the second modulation control information are transmitted through different physical control channels of the physical layer. Therefore, when the first modulation control information and the second modulation control information in the physical control channels are detected, the first modulation control information and the second modulation control information are received. Demodulation processing is performed on the first service information in a corresponding demodulation mode according to the first modulation control information to obtain first encoded information. Independent demodulation processing is performed on the second service information in a corresponding demodulation mod according to a modulation mode contained in the second modulation control information to obtain second encoded information. The demodulation processing performed on the second service information and the demodulation processing performed on the first service information are independent of each other and do not interfere with each other. Therefore, demodulation processing can be performed according to modulation modes of different data, to meet the respective requirement characteristics of the first service information and the second service information.

Figure 10:
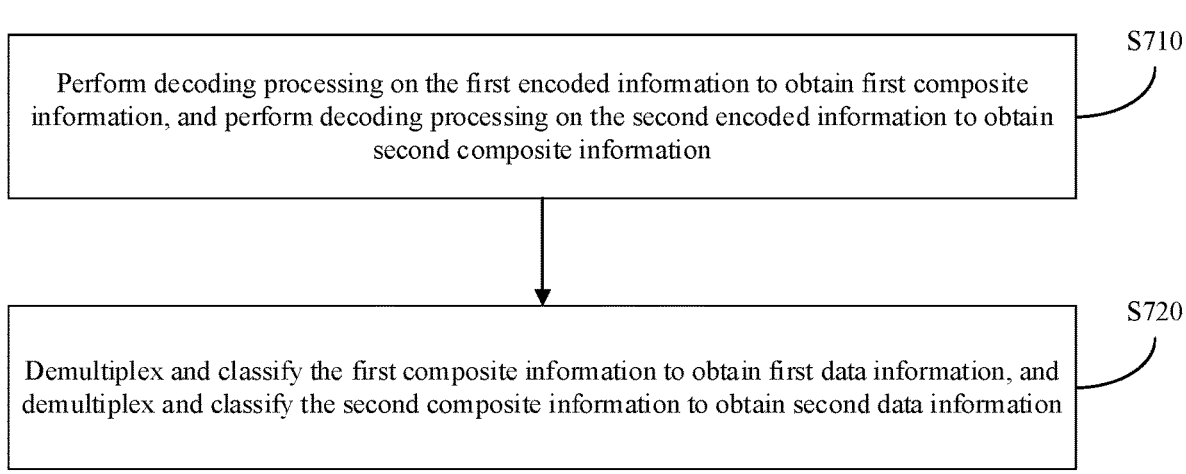
FIG. 10 is a flowchart of an implementation process of S700 in FIG. 7.

Referring to FIG. 10, S700 in the embodiment shown in FIG. 7 further includes, but not limited to, the following steps.

In a step of S710, decoding processing is performed on the first encoded information to obtain first composite information, and decoding processing is performed on the second encoded information to obtain second composite information.

In a step of S720, the first composite information is demultiplexed and classified to obtain first data information, and the second composite information is demultiplexed and classified to obtain second data information.

It can be understood that after performing independent demodulation processing on the first service information and the second service information to obtain first encoded information and second encoded information, it is also necessary to perform decoding processing on the first encoded information and the second encoded information. Independent decoding processing is performed on the first encoded information according to the requirement characteristics of the first encoded information to obtain first composite information. Independent decoding processing is performed on the second encoded information according to the requirement characteristics of the second encoded information to obtain second composite information. The first composite information and the second composite information are transmitted to the media access layer through respective transmission channels of the physical layer connected to the media access layer, where corresponding transmission channels are allocated according to respective requirement characteristics of the first composite information and the second composite information, and the first composite information and the second composite information are independently transmitted to meet the requirement characteristics of the first composite information and the second composite information. In order to improve the transmission efficiency during information transmission, multiple data are multiplexed to obtain composite information. Therefore, it is necessary to perform corresponding demultiplexing and classifying processing on the first composite information and the second composite information respectively, and perform independent processing on the first composite information and the second composite information according to respective requirement characteristics of the first composite information and the second composite information to obtain first data information and second data information. Therefore, by classifying data information with different requirement characteristics and performing independent targeted processing, respective requirements of different data can be met.

Figure 11:
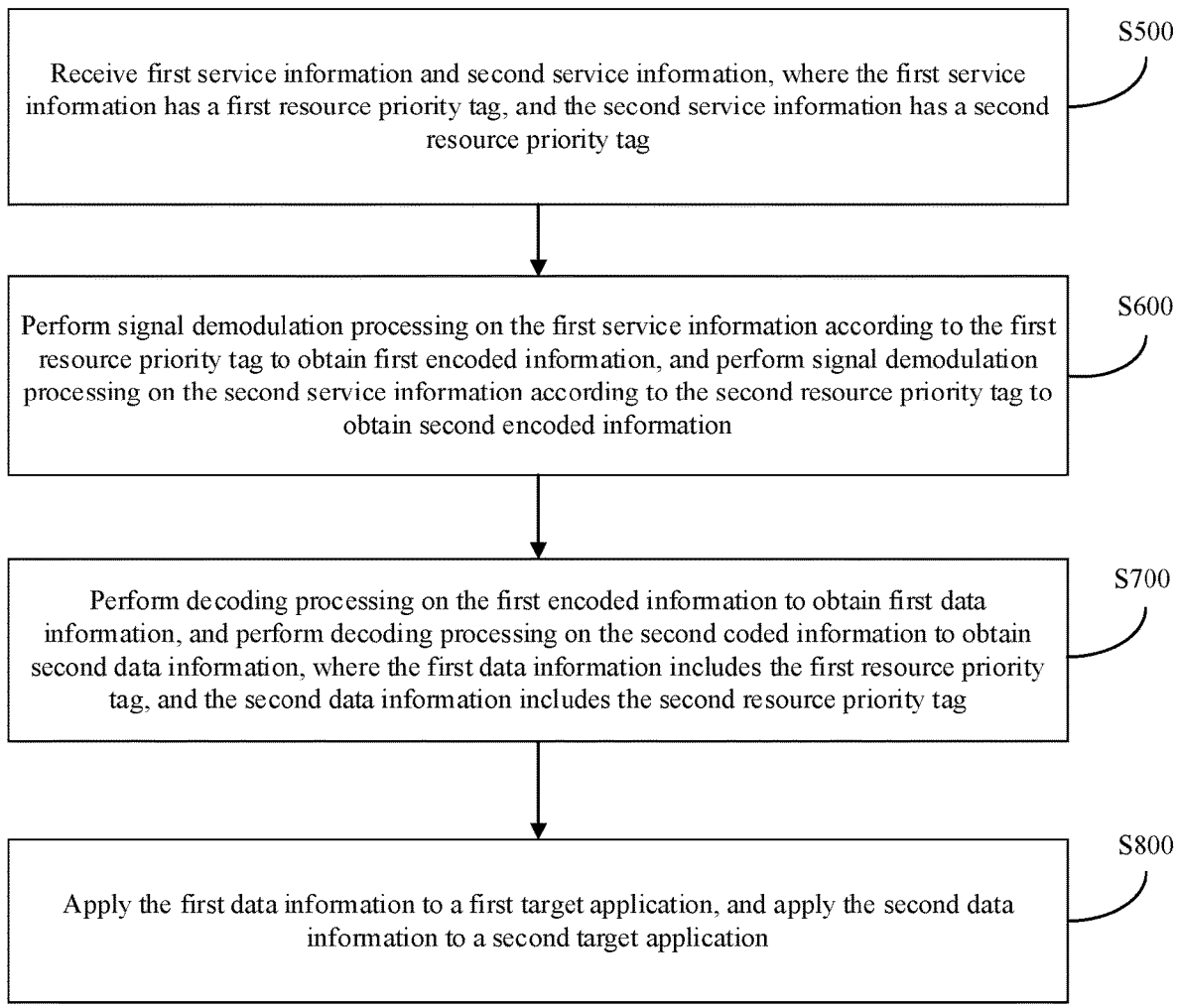
FIG. 11 is a flowchart of an implementation process included after S700 in FIG. 7.

Referring to FIG. 11, after S700 in the embodiment shown in FIG. 7, the method further includes, but not limited to, the following step.

In a step of S800, the first data information is applied to a first target application, and the second data information is applied to a second target application.

It can be understood that the first data information and the second data information may be from the application layer, where the application layer includes multiple target applications, such as a first target application and a second target application, and different types of target applications have data information with different requirements for transmission. Since logical channels of the data link layer are connected to the application layer and the media access layer respectively, the first data information and the second data information are transmitted to the application layer through the logical channels of the data link layer. The first data information is applied to the first target application and the second data information is applied to the second target application according to respective characteristics of the first data information and the second data information, so as to meet requirement characteristics of the first target application and the second target application. For example, the first data information requires high reliability and high delay performances. In the data receiving process, the first data information is processed according to the requirement characteristics of high reliability and high delay performances, and the first target application is applied to special applications such as internet of vehicles, industrial control, telemedicine, etc., that is, in the case where the first target application is in the uRLLC scenario, the first data information can be applied to the first target application to meet the requirement characteristics of the first target application and the first data information. For another example, the second data information requires high throughput and high transmission rate. In the data receiving process, the second data information is processed correspondingly according to the requirement characteristics of high throughput and high transmission rate, and in the case where the second target application is in the eMBB scenario, the second data information can be applied to the second target application to meet the requirement characteristics of the second target application and the second data information.

Figure 12:
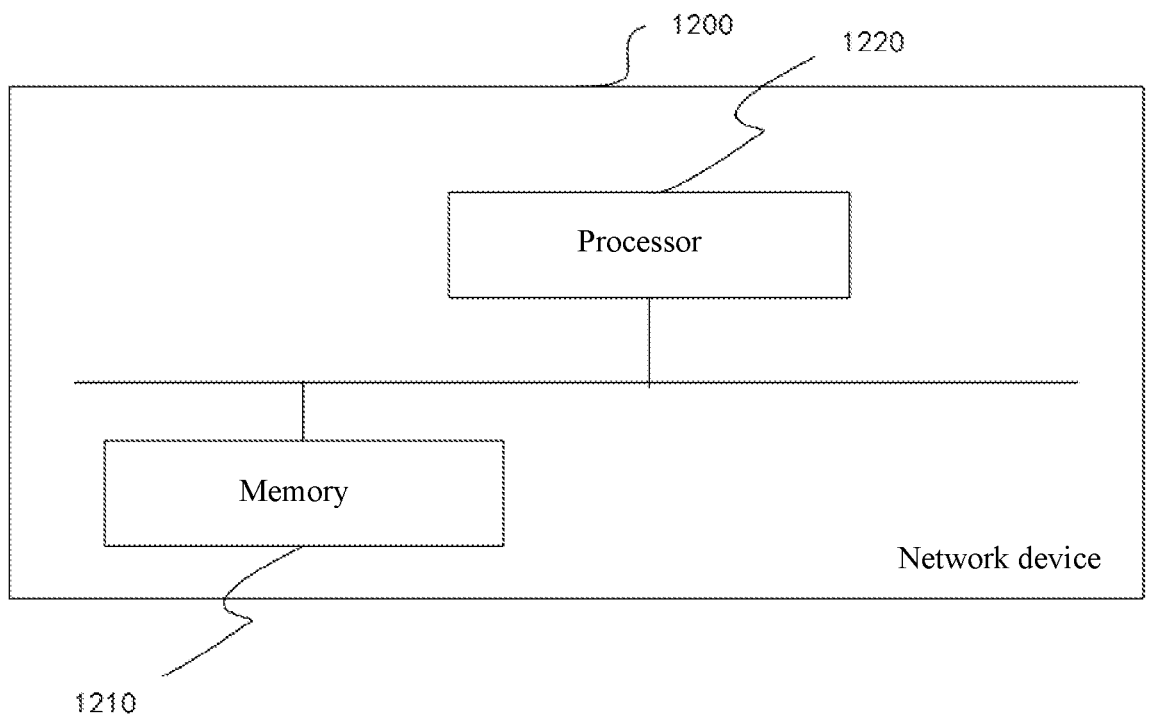
FIG. 12 is a schematic diagram of a network device provided by an embodiment of the present disclosure.

Referring to FIG. 12, FIG. 12 shows a network device 1200 provided by an embodiment of the present disclosure. The network device 1200 includes, but not limited to:

a memory 1210, configured to store a program; and a processor 1220, configured to execute the program stored in the memory 1210, where the computer program, when executed by the processor 1220, causes the processor 1220 to implement the data transmitting method or data receiving method described above.

The processor 1220 and the memory 1210 may be connected by a bus or in other means.

As a non-transient computer-readable storage medium, the memory 1210 may be configured to store a non-transient software program and a non-transient computer-executable program, such as the data transmitting method or data receiving method described in any embodiment of the present disclosure. The non-transient software program and instruction stored in the memory 1210, when executed by the processor 1220, cause the processor 1220 to implement the data transmitting method or data receiving method described above.

The memory 1210 may include a program storage area and a data storage area. The program storage area may store an operating system, and an application program required by at least one function. The data storage area may store data used to perform the data transmitting method or data receiving method described above. In addition, the memory 1210 may include a high-speed random access memory, and may also include a non-transient memory, such as at least one magnetic disk storage device, a flash memory device, or other non-transient solid state storage device. In some implementations, the memory 1210 may include remote memories remotely located with respect to the processor 1220, and these remote memories may be connected to the processor 1220 through networks. Examples of the above networks include, but are not limited to, the Internet, an intranet, a local area network, a mobile communication network and combinations thereof.

The non-transient software programs and instructions required to implement the above data transmitting method or data receiving method are stored in the memory 1210 which, when executed by one or more processors 1220, cause the one or more processors 1220 to implement the data transmitting method or data receiving method provided by any one of the embodiments of the present disclosure.

An embodiment of the present disclosure provides a storage medium, storing a computer-executable instruction which, when executed by a processor, causes the processor to implement the data transmitting method or data receiving method described above.

According to the schemes provided by the embodiments of the present disclosure, data information having different resource priority tags are obtained, that is, data information having different requirements are obtained. Data information is processed separately according to different resource priority tags, that is, the data information having different requirements can be subjected to classification, independent corresponding encoding and signal modulation processing, and data transmission. Therefore, by performing independent targeted processing on different data information according to the resource priority tags, respective transmission requirements of different data can be met.

In an embodiment, the storage medium stores a computer-executable instruction which, when executed by one or more control processors, for example, by one processor in the network device, may cause the one or more processors to perform the data transmitting method or data receiving method provided by any one of the embodiments of the present disclosure.

The embodiments described above are merely illustrative, and the units described as separate components may be or may not be physically separated, that is, they may be located in one place, or may be distributed onto multiple network elements. Some or all of the modules may be selected according to actual needs to achieve the purpose of this embodiment.

Those having ordinary skills in the art will understand that all or some of the steps in the method and the systems disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those having ordinary skills in the art, the term "computer storage medium" includes volatile and nonvolatile, removable and non-removable media implemented in any method or technology for storing information such as computer-readable instructions, data structures, program modules or other data. The computer storage medium may include an RAM, an ROM, an EEPROM, a flash memory or other memory technologies, a CD-ROM, a Digital Versatile Disk (DVD) or other optical disk storage, magnetic cassette, magnetic tape, magnetic disk storage or other magnetic storage devices, or any other media that can be used to store desired information and can be accessed by a computer. In addition, it is well known to those having ordinary skills in the art that the communication medium may generally include computer-readable instructions, data structures, program modules or other data in a modulated data signal such as a carrier wave or other transmission mechanism, and may include any information delivery medium.

The above is a detailed description of several embodiments of the present disclosure, but the present disclosure is not limited to the above embodiments. Those having ordinary skills in the art can also make various equivalent modifications or substitutions without violating the protection scope of the present disclosure, and these equivalent modifications or substitutions are included in the scope defined by the claims of the present disclosure.

What is claimed is:

1. A data transmitting method, comprising:
   acquiring first data information and second data information, wherein the first data information has a first resource priority tag, and the second data information has a second resource priority tag;
   performing encoding processing on the first data information according to the first resource priority tag to obtain first encoded information, and performing encoding processing on the second data information according to the second resource priority tag to obtain second encoded information;
   performing signal modulation processing on the first encoded information to obtain first service information, and performing signal modulation processing on the second encoded information to obtain second service information, wherein the first service information comprises the first resource priority tag, and the second service information comprises the second resource priority tag;
   acquiring first allocation control information and second allocation control information; and
   allocating the first service information to a first resource block for data transmission according to the first allocation control information, and allocating the second service information to a second resource block for data transmission according to the second allocation control information.

2. The data transmitting method of claim 1, wherein the first data information is multiple in number, and the second data information is multiple in number;
   performing encoding processing on the first data information according to the first resource priority tag to obtain first encoded information and performing encoding processing on the second data information according to the second resource priority tag to obtain second encoded information comprises:
   mixing and multiplexing multiple pieces of the first data information according to the first resource priority tag to obtain first composite information, and mixing and multiplexing multiple pieces of the second data information according to the second resource priority tag to obtain second composite information; and
   performing encoding processing on the first composite information to obtain first encoded information, and performing encoding processing on the second composite information to obtain second encoded information.

3. The data transmitting method of claim 1, wherein performing signal modulation processing on the first encoded information to obtain first service information and performing signal modulation processing on the second encoded information to obtain second service information comprises:
   acquiring first modulation control information and second modulation control information; and
   performing signal modulation processing on the first encoded information according to the first modulation control information to obtain first service information, and performing signal modulation processing on the second encoded information according to the second modulation control information to obtain second service information.

4. A network device, comprising:
   a memory, a processor, and a computer program stored in the memory and executable by the processor, wherein the computer program, when executed by the processor, causes the processor to perform the data transmitting method of claim 1.

5. A non-transitory computer-readable storage medium, storing a computer program which, when executed by a processor, causes the processor to perform the data transmitting method of claim 1.

6. A data receiving method, comprising:
   receiving first service information and second service information, wherein the first service information has a first resource priority tag, and the second service information has a second resource priority tag;
   performing signal demodulation processing on the first service information according to the first resource priority tag to obtain first encoded information, and performing signal demodulation processing on the second service information according to the second resource priority tag to obtain second encoded information; and performing decoding processing on the first encoded information to obtain first data information, and performing decoding processing on the second encoded information to obtain second data information, wherein the first data information includes the first resource priority tag, and the second data information includes the second resource priority tag;

wherein receiving first service information and second service information comprises:

receiving first allocation control information and second allocation control information; and acquiring first service information from a first resource block according to the first allocation control information, and acquiring second service information from a second resource block according to the second allocation control information.

7. The data receiving method of claim 6, wherein performing signal demodulation processing on the first service information according to the first resource priority tag to obtain first encoded information and performing signal demodulation processing on the second service information according to the second resource priority tag to obtain second encoded information comprises:

receiving first modulation control information and second modulation control information; and demodulating the first service information according to the first modulation control information and the first resource priority tag to obtain first encoded information, and demodulating the second service information according to the second modulation control information and the second resource priority tag to obtain second encoded information.

8. The data receiving method of claim 7, wherein the data receiving method further comprises:

applying the first data information to a first target application, and applying the second data information to a second target application.

9. The data receiving method of claim 6, wherein performing decoding processing on the first encoded information to obtain first data information and performing decoding processing on the second encoded information to obtain second data information comprises:

performing decoding processing on the first encoded information to obtain first composite information, and performing decoding processing on the second encoded information to obtain second composite information; and demultiplexing and classifying the first composite information to obtain first data information, and demultiplexing and classifying the second composite information to obtain second data information.

10. The data receiving method of claim 9, wherein the data receiving method further comprises:

applying the first data information to a first target application, and applying the second data information to a second target application.

11. The data receiving method of claim 6, wherein the data receiving method further comprises:

applying the first data information to a first target application, and applying the second data information to a second target application.

12. A network device, comprising:

a memory, a processor, and a computer program stored in the memory and executable by the processor, wherein the computer program, when executed by the processor, causes the processor to perform a data receiving method, comprising:

receiving first service information and second service information, wherein the first service information has a first resource priority tag, and the second service information has a second resource priority tag;

performing signal demodulation processing on the first service information according to the first resource priority tag to obtain first encoded information, and performing signal demodulation processing on the second service information according to the second resource priority tag to obtain second encoded information; and performing decoding processing on the first encoded information to obtain first data information, and performing decoding processing on the second encoded information to obtain second data information, wherein the first data information includes the first resource priority tag, and the second data information includes the second resource priority tag;

wherein receiving first service information and second service information comprises:

receiving first allocation control information and second allocation control information; and acquiring first service information from a first resource block according to the first allocation control information, and acquiring second service information from a second resource block according to the second allocation control information.

13. The network device of claim 12, wherein performing signal demodulation processing on the first service information according to the first resource priority tag to obtain first encoded information and performing signal demodulation processing on the second service information according to the second resource priority tag to obtain second encoded information comprises:

receiving first modulation control information and second modulation control information; and demodulating the first service information according to the first modulation control information and the first resource priority tag to obtain first encoded information, and demodulating the second service information according to the second modulation control information and the second resource priority tag to obtain second encoded information.

14. The network device of claim 12, wherein performing decoding processing on the first encoded information to obtain first data information and performing decoding processing on the second encoded information to obtain second data information comprises:

performing decoding processing on the first encoded information to obtain first composite information, and performing decoding processing on the second encoded information to obtain second composite information; and demultiplexing and classifying the first composite information to obtain first data information, and demultiplexing and classifying the second composite information to obtain second data information.

15. A non-transitory computer-readable storage medium, storing a computer program which, when executed by a processor, causes the processor to perform a data receiving method, comprising:
- receiving first service information and second service information, wherein the first service information has a first resource priority tag, and the second service information has a second resource priority tag;
- performing signal demodulation processing on the first service information according to the first resource priority tag to obtain first encoded information, and performing signal demodulation processing on the second service information according to the second resource priority tag to obtain second encoded information; and
- performing decoding processing on the first encoded information to obtain first data information, and performing decoding processing on the second encoded information to obtain second data information, wherein the first data information includes the first resource priority tag, and the second data information includes the second resource priority tag;
- wherein receiving first service information and second service information comprises:
- receiving first allocation control information and second allocation control information; and
- acquiring first service information from a first resource block according to the first allocation control information, and acquiring second service information from a second resource block according to the second allocation control information.

* * * * *